3,121,721
RING E SUBSTITUTED YOHIMB-17-ENES
Jay Donald Albright and Leon Goldman, Nanuet, N.Y., assignors to American Cyanamid Company, Stamford, Conn., a corporation of Maine
No Drawing. Filed June 8, 1962, Ser. No. 200,926
6 Claims. (Cl. 260—287)

This invention relates to new organic compounds and, more particularly, is concerned with novel $\Delta^{17}$ ring E substituted derivatives of yohimbe alkaloids which may be represented by the following general formula:

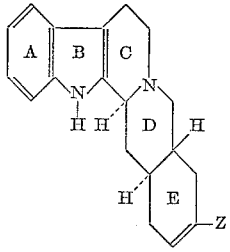

wherein Z is selected from the group consisting of formyl, cyano, carboxy, and lower carbalkoxy. Suitable lower carbalkoxy groups contemplated by the present invention are those having from one to six carbon atoms with carbomethoxy and carbethoxy being preferred. The invention also embraces the useful non-toxic pharmaceutically acceptable acid-addition salts of these new derivatives. Typical acid-addition salts are the hydrochlorides, phosphates, sulfates, citrates, etc.

The novel compounds of the present invention are, in general, white crystalline solids, the free bases of which are soluble in organic solvents such as lower alkanols, chloroform, acetone, ethyl acetate, dimethylformamide, and the like; and the salts of which are soluble in polar solvents such as water and lower alkanols.

The novel compounds of the present invention are valuable central nervous system depressants of low toxicity of both the muscle relaxant and tranquilizer type and may be administered orally or parenterally. When so administered, they have been found to exhibit such activity in amounts ranging from 25 to about 350 mg./kg. of body weight. The novel compounds of the present invention may be used as such but more preferably are used in the form of their non-toxic acid-addition salts which may be readily prepared by treatment with one equivalent of an acid such as hydrochloric, phosphoric, sulfuric, citric, etc.

The novel yohimb-17-ene-18-carboxylic acid of the present invention may be prepared by hydrolyzing 17α-hydroxyyohimban-18α-carbonitrile by conventional hydrolysis with aqueous sodium hydroxide. This hydrolysis gives rise to a mixture of two products, namely, 17α-hydroxyyohimban-18α-carboxylic acid and the desired yohimb-17-ene-18-carboxylic acid, which may be readily separated by conventional means. The yohimb-17-ene-18-carboxylic acid is formed via two routes: (1) elimination of the 17α-hydroxy group from the intermediate 17α-hydroxyyohimban-18α-carboxylic acid, and (2) elimination of the 17α-hydroxy group from the 17α-hydroxy-yohimban-18α-carbonitrile followed by hydrolysis of the intermediate yohimb-17-ene-18-carbonitrile. Similar hydrolysis of the 17β-hydroxyyohimban-18α-carbonitrile gives only 17β-hydroxyyohimban-18α-carboxylic acid and none of the desired yohimb-17-ene-18-carboxylic acid.

Reduction of 17-oxoyohimban-18α-carbonitrile by means of a reducing agent such as an alkali metal borohydride, hydrogen and a catalyst, a metal and a base, etc., yields a mixture of 17α-hydroxyyohimban-18α-carbonitrile and 17β-hydroxyyohimban-18α-carbonitrile. This reaction is preferably carried out in a lower alkanol solvent at room temperature over a period of several hours. The 17-oxoyohimban-18α-carbonitrile may be readily prepared by treating yohimbano[18,17-d]isoxazole with a basic reagent such as, for example, an alkali metal alkoxide, sodium hydride, or mild aqueous alkali. This reaction is preferably carried out in a lower alkanol solvent at room temperature over a period of several hours. The 17-oxoyohimban-18α-carbonitrile may also be prepared by treating 18-hydroxymethyleneyohimban-17-one with O,N-bis(trifluoroacetyl)hydroxylamine. This reaction is preferably carried out in an inert solvent such as benzene at a temperature of 50°–100° C. over a period of time of from 15 minutes to several hours. Yohimbano[18,17-d]-isoxazole may be readily prepared by treating 18-hydroxymethyleneyohimban-17-one with hydroxylamine hydrochloride in a solvent such as galcial acetic acid at 100° C. for a few minutes. 18-hydroxymethyleneyohimban-17-one may be obtained in good yield by treating yohimban-17-one with a lower alkyl formate, such as methyl or ethyl formate, in the presence of a suitable base such as an alkali metal alkoxide, sodium hydride, sodamide, and the like. Yohimban-17-one has been described by Witkop, Ann. 554, 83 (1943).

Yohimb-17-ene-18-carboxylic acid may be esterified by conventional methods such as by treatment with a diazoalkane, or treatment with a lower alkanol in the presence of a mineral acid, or treatment with a lower alkanol in the presence of N,N'-dicyclohexylcarbodiimide. The yohimb-17-ene-18-carboxylate esters may also be prepared by first esterifying 17α-hydroxyyohimban-18α-carboxylic acid by the conventional methods outlined above; followed by conversion of the esters to the 17α-hydroxy O-sulfates, O-mesylates, O-tosylates, O-phosphorodichloridates, O-chlorosulfites, etc.; followed by elimination with a base such as collidine, trimethylamine, aqueous sodium hydroxide, and the like.

Yohimb-17-ene-18-carboxylic acid may be converted to its corresponding acyl halide by treatment with an agent such as oxalyl chloride, phosphorus pentachloride, phosphorus pentabromide, thionyl chloride, thionyl bromide, and the like. The intermediate acyl halides so formed may then be converted to the corresponding aldehyde by a suitable reduction process. Catalytic hydrogenation has been found effective in achieving the final step. Gaseous hydrogen and a suitable catalyst such as a noble metal catalyst, e.g., palladium on barium sulfate, is preferably used. The reduction is preferably carried out in an inert organic solvent such as benzene, toluene, xylene, or the like at temperatures ranging from about 70° C. to about 150° C.

Yohimb-17-ene-18-carboxaldehyde may also be preprepared by the reduction of an 18-lower alkoxymethylene-yohimban-17-one followed by treatment with aqueous mineral acid. This reduction may be carried out with a reducing agent such as lithium aluminum hydride, hydrogen and a catalyst, a metal and a base, etc. in a lower alkanol solvent at room temperature over a period of several hours. Suitable mineral acids are hydrochloric, phosphoric, sulfuric, and the like. The 18-lower alkoxymethyleneyohimban-17-ones may be readily prepared by treating 18-hydroxymethyleneyohimban-17-one with an appropriate lower alkanol in the presence of an acid catalyst such as p-toluenesulfonic acid, sulfuric acid, acetic acid, and the like. The preferred method is to treat 18-hydroxymethyleneyohimban-17-one with a lower alkanol in the presence of glacial acetic acid and anhydrous magnesium sulfate.

Yohimb-17-ene-18-carboxamide may be readily prepared by treating yohimb-17-ene-18-carboxylyl chloride or bromide with ammonia in the conventional manner. The yohimb-17-ene-18-carboxamide so formed may then be dehydrated to the yohimb-17-ene-18-carbonitrile by means of dehydrating agents such as thionyl chloride and phosphorous pentoxide.

The invention will be described in greater detail in conjunction with the following specific examples.

EXAMPLE 1

*Preparation of 18-Hydroxymethyleneyohimban-17-One*

To a cooled mixture of 10.0 g. of yohimban-17-one, 10.0 g. of sodium methoxide, and 300 ml. of sodium-dried benzene was added 14 ml. of ethyl formate. The mixture was stirred under nitrogen at room temperature for 20 hours and poured onto a mixture of 300 g. of ice and 200 ml. of water. The organic layer was separated and washed with three, 100-ml. portions of 0.1 N sodium hydroxide. The basic washings and aqueous layer were combined and neutralized in the cold with acetic acid. Filtration afforded 9.4 g. of 18-hydroxymethylene-yohimban-17-one hemihydrate as tan crystals, M.P. 140°–147° C. On standing in the cold overnight, the mother liquor gave an additional 1.8 g. of crystals. Recrystallization from methanol afforded colorless needles, sintering to a glass at 145°–148° C., M.P. 207°–210° C. (dec.).

EXAMPLE 2

*Preparation of 18-Hydroxymethyleneyohimban-17-One*

A mixture of 5.0 g. of yohimban-17-one, 5.0 g. of sodium methoxide, 150 ml. of dry peroxide-free dioxane, and 7.0 ml. of ethyl formate was stirred at room temperature under nitrogen for 21 hours. The mixture was neutralized with acetic acid and concentrated nearly to dryness. The residue was crystallized from aqueous methanol to yield 5.3 g. of 18-hydroxymethyleneyohimban-17-one hemihydrate as tan crystals, sintering to a glass at 145°–154° C., M.P. 207–210° C. (dec.).

EXAMPLE 3

*Preparation of Yohimbano[17,18-c]isoxazole and Yohimbano[18,17-d]isoxazole Hydrochlorides*

A mixture of 1.0 g. of 18-hydroxymethylene-yohimban-17-one, 0.225 g. of hydroxylamine hydrochloride and 15 ml. of glacial acetic acid was heated in an oil bath at 100° C. for 6 minutes. The mixture was cooled and filtered to give 0.43 g. of colorless needles. Recrystallization from aqueous methanol afforded 0.148 g. of a mixture of hydrochlorides of yohimbano[17,18-c]isoxazole and yohimbano[18,17-d]isoxazole as colorless needles, M.P. 310°–315° C. (dec.), containing one-fourth mole of water of crystallization.

EXAMPLE 4

*Preparation of 17-Oxoyohimban-18α-Carbonitrile*

A mixture of 0.360 g. of yohimbano[17,18-c]-isoxazole and yohimbano[18,17-d]isoxazole was added to a solution of 0.115 g. of sodium in 10 ml. of ethanol. After standing overnight, the mixture was refluxed under nitrogen for 3 hours. The mixture was neutralized with acetic acid and diluted with water to give 0.261 g. of tan crystals, M.P. 263–268° C. (dec.). Purification of a sample by chromatography over silica gel afforded 17-oxoyohimban-18α-carbonitrile containing one-fourth mole of water of crystallization as tan needles, M.P. 278–280° C. (dec.).

EXAMPLE 5

*Preparation of 17-Oxoyohimban-18α-Carbonitrile*

A suspension of 0.350 g. of 18-hydroxymethyleneyohimban-17-one in 10 ml. of benzene was partially distilled to remove moisture. To the resulting suspension was added 0.161 ml. of dry pyridine, 0.340 g. of O,N-bis(trifluoroacetyl)hydroxylamine, and 1 ml. of dry acetone and the resulting mixture was heated at 75–80° C. by means of an oil bath for 2 hours. The solvent was removed under reduced pressure to give a dark brown gum which was partitioned between 6 ml. of saturated sodium bicarbonate and 5 ml. of chloroform. The aqueous layer was further washed with chloroform and the combined organic layers were dried over magnesium sulfate and evaporated. The resulting brown solid (0.227 g.) was crystallized successively from methanol-chloroform, acetone-petroleum ether (B.P. 20–40°) and methanol-water to give crystals of 17-oxoyohimban-18α-carbonitrile, M.P. 265–272° C. (dec.).

EXAMPLE 6

*Preparation of 17α-Hydroxyyohimban-18α-Carbonitrile and 17β-Hydroxyyohimban-18α-Carbonitrile*

To a cooled solution of 0.350 g. of sodium borohydride in 50 ml. of ethanol was added 2.00 g. of 17-oxoyohimban-18α-carbonitrile. The mixture was stirred at room temperature for 4 hours. The excess sodium borohydride was decomposed with acetic acid and the solvent removed under reduced pressure. The residual pale yellow solid was partitioned between chloroform and water, and the chloroform-soluble product was chromatographed on alumina (activity III). Elution with chloroform:acetone (3:2) afforded 0.460 g. of solid which when crystallized from aqueous methanol gave 0.135 g. of 17α-hydroxyyohimban-18α-carbonitrile, containing one-fourth mole of water of crystallization, as tan crystals, M.P. 260–265° C. (dec.) (sintering at 200° C.).

Further elution of the column with chloroform:methanol (99:1) afforded 0.534 g. of solid which when crystallized from methanol gave 0.360 g. of 17β-hydroxyyohimban-18α-carbonitrile, containing one-fourth mole of water of crystallization, as white fluffy needles, M.P. 247–250° C. (dec.) (sintering at 242° C.).

EXAMPLE 7

*Preparation of 17α - Hydroxyyohimban - 18α-Carboxylic Acid, Methyl 17α-Hydroxyyohimban-18α-Carboxylate, and Methyl Yohimb-17-Ene-18-Carboxylate*

A mixture of 0.100 g. of 17α-hydroxyyohimban-18α-carbonitrile, 4.0 ml. of ethanol, 1.0 ml. of water and 0.250 g. of sodium hydroxide was refluxed for 21 hours. The solvent was removed and the residue was dissolved in 5.0 ml. of water and neutralized with acetic acid. The solid was removed by filtration and washed with 3.0 ml. of water and dried. There was obtained 0.080 g. of crude 17α-hydroxyyohimban-18α-carboxylic acid. A second crop of acid (0.010 g.) was obtained from the mother liquors on standing. The combined crops of crude 17α-hydroxyyohimban-18α-carboxylic acid were suspended in methanol and treated with excess diazomethane in ether. Decomposition of the excess diazomethane with acetic acid and evaporation of the solvent under reduced pressure gave 0.092 g. of a glass.

Chromatography of the glass over alumina (activity III) with chloroform as the eluent afforded 0.009 g. of methyl yohimb-17-ene-18-carboxylate as off-white needles, M.P. 215–220° C. (dec.). Further elution with chloroform afforded 0.012 g. of methyl 17α-hydroxyyohimban-18α-carboxylate, containing one mole of methanol of crystallization, as tan needles, M.P. 206–211° C. (dec.).

EXAMPLE 8

*Preparation of Methyl 17α-Hydroxyyohimban-18α-Carboxylate O-Tosylate*

To a solution of 0.386 g. of methyl 17α-hydroxyyohimban-18α-carboxylate in 2.0 ml. of dry pyridine was added 0.517 g. of p-toluenesulfonyl chloride. The mixture was allowed to stand at room temperature for 66 hours. The dark red-brown solution was poured into a mixture of 12 g. of ice and 15 ml. of chloroform. After standing at room temperature for 2 hours the mixture was made basic with ammonium hydroxide. The organic layer was separated and the aqueous layer extracted with three 25-ml. portions of chloroform. The combined chloroform extracts were dried over sodium sulfate and concentrated under reduced pressure. The last traces of pyridine were removed by repeated addition of toluene and concentration under reduced pressure. There remained 0.380 g. of crude product, M.P. 149–154° C. (dec.). Recrystallization from hot ethanol with the aid of activated charcoal afforded methyl 17α-hydroxyyohimban-18α-carboxylate O-tosylate as tan crystals, M.P. 240–255° C. (dec.) (sintering above 190° C.).

EXAMPLE 9

*Preparation of Methyl Yohimb-17-Ene-18-Carboxylate*

A mixture of 0.100 g. of methyl 17α-hydroxyyohimban-18α-carboxylate O-tosylate and 1.5 ml. of 2,4,6-collidine was heated at 160–170° C. for 2 hours. The mixture was cooled, diluted with 10 ml. of water and extracted with four 10-ml. portions of chloroform. The chloroform extracts were dried over magnesium sulfate and concentrated to dryness under reduced pressure. The residue was crystallized from aqueous methanol to give 0.044 g. of methyl yohimb-17-ene-18-carboxylate as brown crystals, M.P. 223–230° C. (dec.). Recrystallization from aqueous methanol afforded tan needles M.P. 224–228° C. (dec.).

EXAMPLE 10

*Preparation of 18-Isobutoxymethyleneyohimban-17-One*

A mixture of 0.331 g. of 18-hydroxymethyleneyohimban-17-one, 5.0 ml. of redistilled isobutyl alcohol, 5.0 ml. of glacial acetic acid and 1.0 g. of anhydrous magnesium sulfate was stirred at room temperature for 20 hours. The mixture was cooled and poured into 50 ml. of cold 4 N sodium hydroxide and extracted with chloroform. The chloroform extract was dried over sodium sulfate and concentrated under reduced pressure to a glass (0.204 g.). The glass was crystallized from aqueous acetone to give 0.142 g. of 18-isobutoxymethyleneyohimban-17-one sesquihydrate as tan needles, M.P. 119°–123° C. Drying over phosphorous pentoxide gave the anhydrous substance, M.P. 176°–182° C. (dec.).

EXAMPLE 11

*Preparation of Yohimb-17-Ene-18-Carboxaldehyde*

To 0.050 g. of lithium aluminum hydride in 10 ml. of dry tetrahydrofuran was added 0.397 g. of 18-isobutoxymethyleneyohimban-17-one and the mixture was stirred under nitrogen for 2 hours at room temperature. The mixture was cooled in an ice bath and 3.0 g. of ice was added. After the gas evolution subsided, 6.0 g. of ice was added followed by slow addition of a solution prepared from 6.0 g. of ice and 25 drops of concentrated sulfuric acid. The cold mixture was stirred for one-half hour, diluted with 25 ml. of chloroform and made slightly basic with 10 N sodium hydroxide. The pH was then adjusted to 7 with acetic acid. The chloroform layer was separated and the aqueous layer extracted with three 25-ml. portions of chloroform. The combined extracts were dried over magnesium sulfate and concentrated under reduced pressure to give 0.177 g. of tan crystals, M.P. 182–188° C. (dec.). Recrystallization from ethanol afforded 0.089 g. of yohimb-17-ene-18-carboxaldehyde as off-white needles, M.P. 207–211° C. (dec.).

What is claimed is:

1. A compound selected from the group consisting of ring E substituted yohimbe alkaloids of the formula:

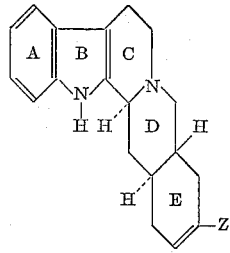

wherein Z is selected from the group consisting of formyl, cyano, carboxy and lower carbalkoxy; and the pharmaceutically acceptable acid-addition salts thereof.
2. Yohimb-17-ene-18-carboxaldehyde.
3. Yohimb-17-ene-18-carbonitrile.
4. Yohimb-17-ene-18-carboxylic acid.
5. Methyl yohimb-17-ene-18-carboxylate.
6. Ethyl yohimb-17-ene-18-carboxylate.

References Cited in the file of this patent

UNITED STATES PATENTS 2,883,385    Huebner et al. _____ Apr. 21, 1959

OTHER REFERENCES

The Chemical Age Chem. Dict., Ernest Benn Ltd., London (1924), page 89.

Manske: The Alkaloids, Academic Press, New York (1960), vol. VII, page 62.